(12) United States Patent
Domann et al.

(10) Patent No.: US 12,180,790 B1
(45) Date of Patent: Dec. 31, 2024

(54) REMOTE DISCONNECTION OF UTILITY LINES IN OFFSHORE WELL OPERATIONS

(71) Applicant: Halliburton Energy Services, Inc., Houston, TX (US)

(72) Inventors: Robert Eugene Domann, Duncan, OK (US); Konstantin Ermakov, Kuala Lumpur (MY)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/665,164

(22) Filed: May 15, 2024

(51) Int. Cl.
| | |
|---|---|
| *E21B 19/16* | (2006.01) |
| *E21B 41/00* | (2006.01) |
| *F16L 39/02* | (2006.01) |
| *H01R 13/629* | (2006.01) |
| *H01R 13/635* | (2006.01) |
| *H01R 13/637* | (2006.01) |
| *H01R 43/26* | (2006.01) |

(52) U.S. Cl.
CPC ........ *E21B 19/165* (2013.01); *E21B 41/0007* (2013.01); *F16L 39/02* (2013.01); *H01R 13/62938* (2013.01); *H01R 13/635* (2013.01); *H01R 13/637* (2013.01); *H01R 43/26* (2013.01); *F16L 2201/20* (2013.01)

(58) Field of Classification Search
CPC .... E21B 19/165; E21B 41/0007; F16L 39/02; F16L 2201/20; H01R 13/62938; H01R 13/635; H01R 13/637; H01R 43/26
See application file for complete search history.

(56) References Cited

U.S. PATENT DOCUMENTS

| | | | | |
|---|---|---|---|---|
| 5,342,098 A | * | 8/1994 | Wilkins | F16L 37/56 285/309 |
| 5,507,530 A | * | 4/1996 | Mahaney | E02F 3/3654 29/237 |
| 7,258,369 B2 | * | 8/2007 | Martin | F16L 37/56 285/38 |
| 7,311,338 B2 | * | 12/2007 | Osterloh | B01L 9/00 248/657 |

(Continued)

FOREIGN PATENT DOCUMENTS

JP 2001522517 A * 11/2001

*Primary Examiner* — Aaron L Lembo
(74) *Attorney, Agent, or Firm* — Kilpatrick Townsend & Stockton LLP

(57) ABSTRACT

A quick-disconnect multi-coupler assembly for disconnecting utility lines connecting well equipment to power sources. The utility lines may be hoses or electrical cables. The power sources may be pressurized fluid or electrical energy sources. The well equipment may be located on an offshore platform and the power sources may be located on a floating support vessel. A fixed mounting plate located on the floating support vessel may be connected to the power sources by vessel-side utility lines. A removable mounting plate may be connected to the well equipment by well-side utility lines, and can be releasably coupled to the fixed mounting plate to provide a pressurized fluid or electrical energy pathway from the power sources to the well equipment. Rapid disconnection of the well-side utility lines from the power sources may be performed by decoupling the mounting plates using a decoupling cylinder that can be activated from a remote location.

20 Claims, 10 Drawing Sheets

(56) References Cited

U.S. PATENT DOCUMENTS

| | | | | |
|---|---|---|---|---|
| 7,389,794 B2* | 6/2008 | Knuthson | ............... | F16L 37/20 |
| | | | | 285/120.1 |
| 8,864,179 B2* | 10/2014 | Kitagawa | ................ | F16L 37/36 |
| | | | | 285/124.3 |
| 9,605,772 B2 | 3/2017 | Mckee et al. | | |
| 11,041,584 B2* | 6/2021 | Foner | ...................... | F16L 37/16 |
| 11,079,053 B2* | 8/2021 | Wolf | ........................ | F16L 37/56 |
| 11,555,569 B2* | 1/2023 | Norton | .................... | F16L 37/20 |
| 12,044,343 B2* | 7/2024 | Dixon | ..................... | F16L 37/56 |
| 2019/0350118 A1* | 11/2019 | Maro | .................. | A01B 59/042 |

* cited by examiner

REMOTE DISCONNECTION OF UTILITY LINES IN OFFSHORE WELL OPERATIONS

TECHNICAL FIELD

The present disclosure relates generally to offshore well operations, and more particularly (although not necessarily exclusively) to the remote disconnection of utility lines connecting a floating support vessel to an offshore platform during a well operation.

BACKGROUND

In offshore environments, coiled tubing may be used to perform well intervention operations or other operations that might otherwise be unworkable. Due to the large size and weight of coiled tubing equipment and the often limited deck space of offshore platforms, at least certain items of coiled tubing equipment such as the tubing reel, power pack, and control cabin may be located on a floating support vessel that is positioned near the offshore platform. Multiple hoses and cables may be connected between the offshore platform and the floating support vessel. The hoses and cables may be used to supply cooperating coiled tubing equipment on the offshore platform with pressurized fluid and electrical energy from the floating support vessel. In the case of a sudden change in weather or sea state, or in case of an emergency, rapid disconnection of the hoses and cables may be needed in order to avoid damage to the hoses or cables or to the floating support vessel. Remote disconnection is desirable for both timing and safety reasons. Remote disconnection may be achievable by hose or cable tension in some cases. However, for various reasons including component misalignment and non-optimal force direction, a disconnection operation that relies on hose or cable tension may result in incomplete disconnection. Furthermore, accumulated tension forces can result in a rapid movement of the hoses or cables upon disconnection, which may pose a danger to nearby personnel.

DETAILED DESCRIPTION

Figure 1:
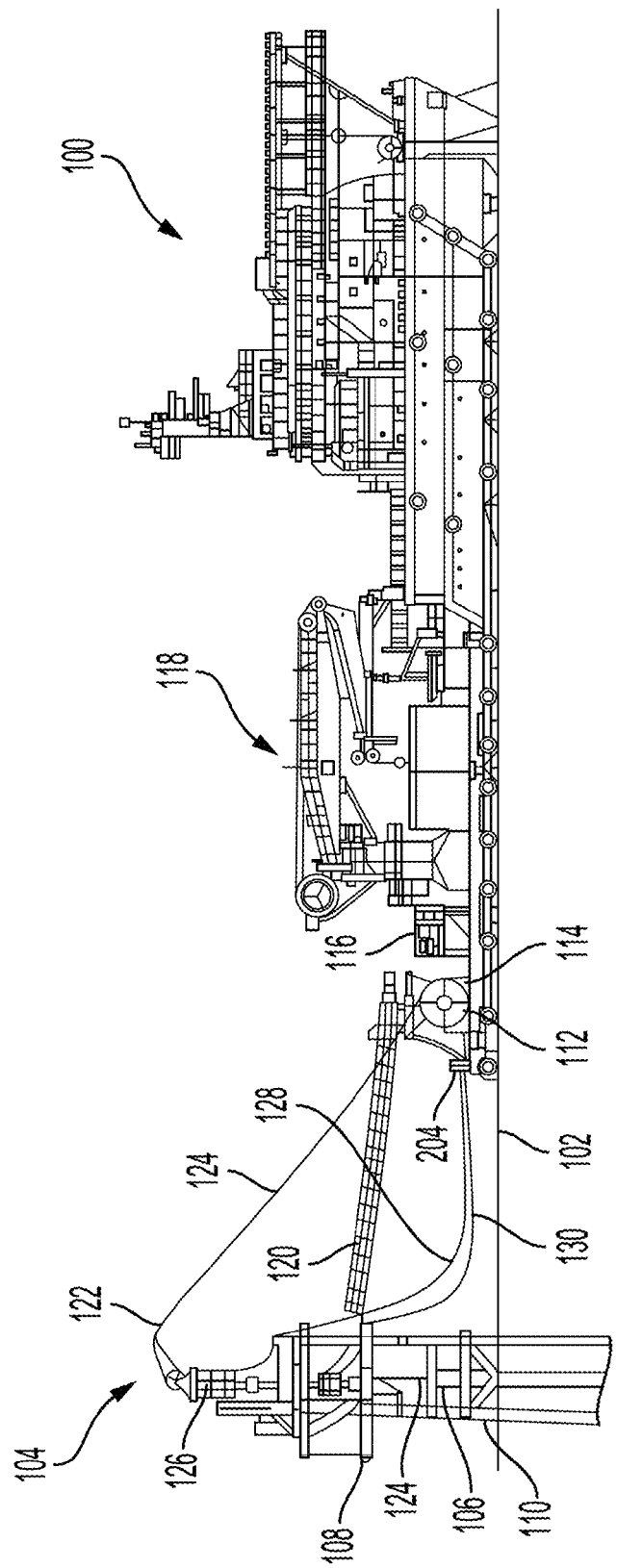
FIG. 1 is a schematic diagram of an offshore platform having a floating support vessel positioned nearby to support a coiled tubing operation according to one example of the present disclosure.
Figure 2:
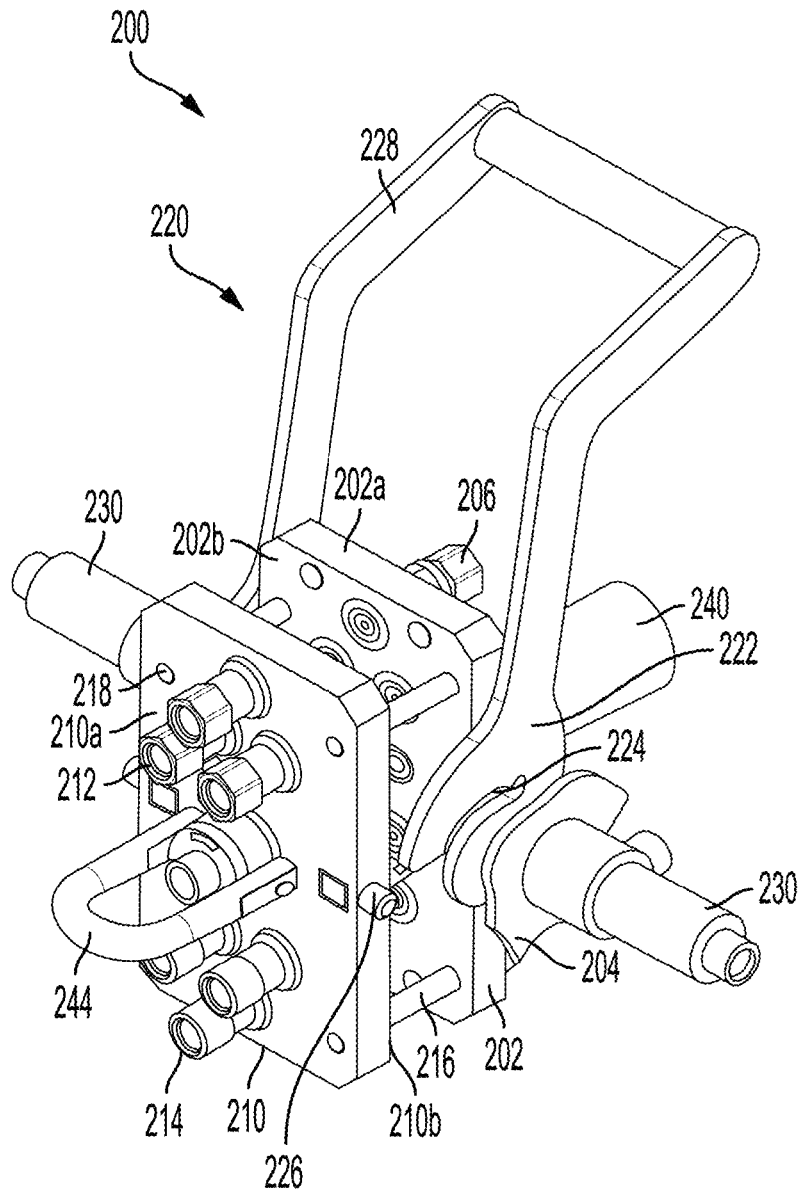
FIG. 2 is a perspective view of a quick-disconnect multi-coupler assembly in a disconnected position according to an example of the present disclosure.
Figure 3:
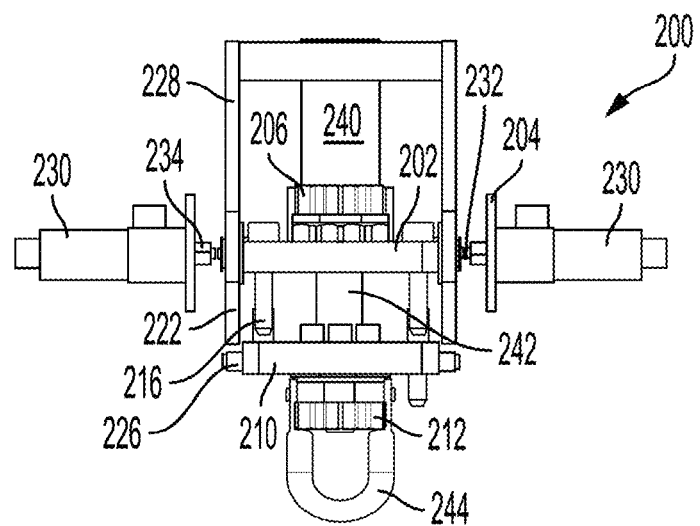
FIG. 3 is a top view of the quick-disconnect multi-coupler assembly of FIG. 2.
Figure 4:
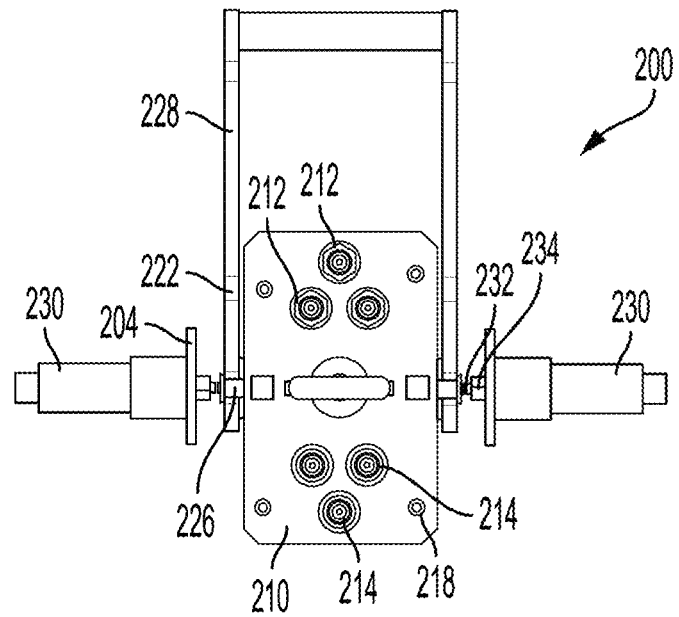
FIG. 4 is a front elevation view of the quick-disconnect multi-coupler assembly of FIG. 2.

Certain aspects and examples of the present disclosure relate to a quick-disconnect multi-coupler assembly configured to produce a rapid and forced disconnection of utility lines coupling powered components to sources of fluid or electrical power. In some examples, the powered equipment can be coiled tubing equipment. In some examples, the powered equipment can be a hydraulic workover (HWO) unit. In some examples, at least some of the powered equipment is located on an offshore well platform ("offshore platform") and the sources of fluid or electrical power are located off-platform, such as on a nearby floating support vessel. In other examples, the powered equipment and the sources of fluid or electrical power can be located on shore. The utility lines may be fluid lines such as hoses or other flexible conduits, electrical cables, or a combination thereof. In some examples, the utility lines may also include data cables. The utility lines can convey a supply of pressurized fluid (e.g., hydraulic fluid or air), electrical energy, data, or a combination thereof, from the sources of fluid or electrical power, or data, to the powered equipment, to computing equipment, etc.

A quick-disconnect multi-coupler assembly may include a fixed mounting plate that is attached to a support framework on a floating support vessel. In such an example, one or more vessel-side fluid lines may be coupled to fluid connectors associated with ports in the fixed mounting plate to provide fluid communication between the fixed mounting plate and a source or sources of pressurized fluid on the floating support vessel. Similarly, one or more vessel-side electrical cables may be coupled to electrical connectors on the fixed mounting plate to provide electrical communication between the fixed mounting plate and a source or sources of electrical energy on the floating support vessel. A quick-disconnect multi-coupler assembly may also include a removable mounting plate. One or more platform-side fluid lines may be coupled to fluid connectors associated with ports in the removable mounting plate to provide fluid communication between the removable mounting plate and coiled tubing or HWO equipment on the offshore platform. Similarly, one or more platform-side electrical cables may be coupled to electrical connectors on the removable mounting plate to provide electrical communication between the removable mounting plate and coiled tubing or HWO equipment on the offshore platform. In some examples, the fluid connectors and the electrical connectors may be quick disconnect fittings.

The fixed mounting plate and the removable mounting plate are designed to be releasably coupled. The ports associated with each mounting plate can be located so as to be aligned and to form fluid pathways through the coupled mounting plates, and electrical connectors associated with each mounting plate can be located so as to be aligned and to be placed in electrical communication upon coupling of the mounting plates. Therefore, when the mounting plates are coupled, the platform-side utility lines and the vessel-side utility lines are also coupled and pressurized fluid or electrical energy may be transferred from the floating support vessel to the coiled tubing or HWO equipment on the offshore platform.

Guide elements such as guide pins, guide tabs, or other guide elements may be provided to facilitate proper plate alignment during a mounting plate coupling operation. A mounting plate coupling mechanism such as a cam mechanism may be provided to force the mounting plates into secure contact with each other. In some examples, the cam mechanism may include a handle to facilitate manual operation of the cam mechanism and coupling of the mounting plates.

A quick-disconnect multi-coupler assembly may eliminate reliance on hydraulic forces for maintaining a coupled arrangement of the mounting plates during normal operation. Instead, a quick-disconnect multi-coupler assembly may include a mechanical plate locking mechanism for maintaining a coupled arrangement of the mounting plates. In one example, the plate locking mechanism can include a pair of linear actuators, such as hydraulic or pneumatic cylinders, which are mounted to the support framework on the floating support vessel so as to reside on opposite sides of the fixed mounting plate of the quick-disconnect multi-coupler assembly. Each cylinder may be operative to extend and retract a lock pin. Extension of the lock pins can releasably lock the coupled mounting plates to each other. In another example, only one plate locking cylinder may be used, either with or without and assistive linkage.

A quick-disconnect multi-coupler assembly may further include a quick-disconnect mechanism for producing a quick disconnect of the utility lines via a forced and rapid decoupling of the mounting plates. In one example, the quick-disconnect mechanism may include at least one hydraulic or pneumatic decoupling cylinder for decoupling the coupled mounting plates. For example, a decoupling cylinder may be mounted to a vessel-side of the fixed mounting plate, and may include a piston rod that is extendable through an opening in the fixed mounting plate to impart a decoupling force against a vessel-side of the removable mounting plate. The decoupling force can cause a rapid decoupling of the mounting plates and, thereby, a corresponding rapid disconnection of the platform-side utility lines from the floating support vessel.

In some examples, a backup decoupling mechanism may also be present. The backup decoupling mechanism may operate to decouple the mounting plates if the quick-disconnect mechanism fails to operate or does not operate properly. The backup decoupling mechanism may operate using tension in a cable attached between the offshore platform and a coupling element on the removable mounting plate, or using tension in the fluid hoses or electrical cables connected to the removable mounting plate.

The quick disconnect mechanism can be operated remotely, such as by personnel located in a control cabin on the floating support vessel. Activation of the quick disconnect mechanism may be based, for example, on the observation by personnel of weather or sea conditions surrounding the floating support vessel or the offshore platform, or based on an observed loss of positional control of the floating support vessel. Alternatively, activation of the quick disconnect mechanism by floating support vessel or offshore platform personnel may be based on an alert resulting from a sensor signal. In some examples, activation of the quick disconnect mechanism may be accomplished using a controller (e.g., control valve) located in the control cabin or elsewhere on the floating support vessel or the offshore platform.

Illustrative examples follow and are given to introduce the reader to the general subject matter discussed herein rather than to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 schematically depicts a floating support vessel 100 floating on a sea surface 102 and positioned near an offshore platform 104 to support a coiled tubing operation on the offshore platform 104. The offshore platform 104 may be located over a submerged oil or gas well located in a sea floor. A wellbore may extend from the sea floor through a subterranean formation, which can be a fluid-bearing formation. A subsea conduit 106 can extend from the offshore platform into a wellhead installation on the sea floor. The offshore platform can include, for example, a platform 108 and a derrick 110. The derrick 110 may include equipment for raising and lowering tools used in drilling, testing, or completion operations. During a drilling operation such tools may include, for example, measuring-while-drilling and logging-while drilling tools and devices. After completion of the wellbore, such tools may include, for example, wireline and associated wireline logging and formation testing tools, wellbore intervention tools, etc.

In some examples, the floating support vessel 100 can be an anchored barge. In other examples, the floating support vessel 100 can be a dynamically positioned ship. As illustrated, the floating support vessel 100 may carry various pieces of coiled tubing system equipment that allows a coiled tubing operation to be performed at the offshore platform 104. For example, the floating support vessel 100 in this example is shown to include a coiled tubing reel 112, a power pack 114 for providing hydraulic power to the coiled tubing system, and a control cabin 116 from which a coiled tubing operation can be managed. Additional coiled tubing reels may also be carried by the floating support vessel 100. A crane 118 or a similar lifting device may be provided to move equipment and to load and unload coiled tubing reels between a storage location and a use location. In some examples, the crane 118 may also be capable of reaching the offshore platform 104. In some examples, a gangway 120 may be temporarily extended between the floating support vessel 100 and the offshore platform 104 to facilitate the movement of personnel therebetween.

As shown in FIG. 1, the offshore platform 104 in this example is provided with coiled tubing equipment that cooperates with the coiled tubing equipment on the floating support vessel 100 to perform a coiled tubing operation at the offshore platform 104. For example, the offshore platform 104 can include a catenary tubing guide 122 that receives coiled tubing 124 from the coiled tubing reel 112 on the floating support vessel 100 and directs the coiled tubing 124 into an injector head 126. The injector head 126 can be configured to grip the coiled tubing 124 and to lower the coiled tubing 124 into the subsea conduit 106 or extract the coiled tubing 124 from the subsea conduit 106.

Various types of coiled tubing operations may be performed at the offshore platform 104. For example, coiled tubing may be used in a completion operation. Coiled tubing may also be particularly useful in a number of different intervention operations. For example, coiled tubing may be used to perform well stimulation operations, such as through acidizing or hydraulic fracturing, in well integrity remediation operations, in flow assurance operations such as for removal of scale or organic deposition, or in operations to sustain well production. Other uses for the coiled tubing 124 at the offshore platform 104 are also possible.

During a coiled tubing operation, the floating support vessel 100 may provide the pressurized fluid or electrical energy required by some or all of the coiled tubing operation equipment located on the offshore platform 104. For example, the injector head 126 on the offshore platform 104 may be operated using pressurized hydraulic fluid provided by the floating support vessel 100. Other equipment located on the offshore platform 104 and related directly or indirectly to a coiled tubing operation may be similarly powered by pressurized fluid or electrical energy from the floating support vessel 100.

To supply coiled tubing operation equipment located on the offshore platform 104 with pressurized fluid or electrical energy, a plurality of hoses, electrical cables, or both, may extend from the floating support vessel 100 to the offshore platform 104. In the case of inclement weather, a change in wave or other sea conditions, or an emergency on the floating support vessel 100 or the offshore platform 104, it may be necessary to quickly move the floating support vessel 100 away from the offshore platform 104. In such an event, or in a case where positional control of the floating support vessel 100 is lost, a rapid disconnection of the hoses or electrical cables may be needed in order to avoid damaging the hoses or cables, or causing damage to the floating support vessel 100. Remote disconnection of the hoses or cables is desirable in such a situation at least to ensure that the disconnection operation occurs in a timely manner. Remote disconnection may also better ensure the safety of personnel on board the floating support vessel 100.

FIGS. 2-9 present various views and operational positions of one example of a quick-disconnect multi-coupler assembly 200 that is usable to produce a rapid disconnection of fluid hoses or electrical cables connected between one or more power sources and one or more pieces of powered equipment. For example, the power sources may be the sources of pressurized fluid or electrical energy located on the floating support vessel 100 and the powered equipment may be the coiled tubing equipment on the offshore platform 104. FIGS. 2-5 depict the quick-disconnect multi-coupler assembly 200 in a partially decoupled state, while FIGS. 6-9 depict the quick-disconnect multi-coupler assembly 200 in a coupled state.

As shown, the quick-disconnect multi-coupler assembly 200 may include a fixed mounting plate 202. The fixed mounting plate 202 can be configured for attachment to a support framework 204, only a minimal portion of which is represented in FIGS. 2-9 for clarity of the drawings. The support framework 204 can be mounted to the floating support vessel 100, such as on the deck of the floating support vessel 100 and near a vessel edge.

At least one utility line connector may be affixed to a front (vessel) side 202*a* of the fixed mounting plate 202. In this example, multiple utility line connectors are affixed to the fixed mounting plate 202 and include fluid hose connectors 206 and electrical cable connectors 208. The number of utility line connectors may vary in other examples. Likewise, other fixed mounting plate examples may include only fluid line connectors or only electrical cable connectors rather than a combination of both. The specific type of fluid line connectors and electrical cable connectors may also vary. In this example, the fluid hose connectors 206 and the electrical cable connectors 208 are quick-disconnect connectors.

Each of the fluid hose connectors 206 and the electrical cable connectors 208 can be associated with a bore that passes through the fixed mounting plate 202. In the case of a fluid hose connector 206, the associated bore forms a port for passage of pressurized fluid through the fixed mounting plate 202. In the case of an electrical cable connector 208, the associated bore allows for passage therethrough of a body of the electrical cable connector 208 such that an opposite connecting end thereof can be exposed along a rear (platform) side 202*b* of the fixed mounting plate 202 for subsequent electrical connection with a complimentary electrical connector in a removable mounting plate. Fluid hoses and electrical cables may be respectively connected to the fluid hose connectors 206 and the electrical cable connectors 208 to connect the fixed mounting plate 202 to one or more sources of pressurized fluid and or more sources of electrical energy on the floating support vessel 100.

The quick-disconnect multi-coupler assembly 200 may also include a removable mounting plate 210. The removable mounting plate 210 can be configured for releasable coupling to the fixed mounting plate 202. At least one utility line connector may be affixed to a front (platform) side 210*a* of the removable mounting plate 210. In this example, multiple utility line connectors are affixed to the removable mounting plate 210 and include fluid hose connectors 212 and electrical cable connectors 214. The specific type of fluid hose connectors 212 and electrical cable connectors 214 may vary, but are also quick-disconnect connectors in this example.

Each of the fluid hose connectors 212 and the electrical cable connectors 214 can be associated with a bore that passes through the removable mounting plate 210 and corresponds to a bore in the fixed mounting plate 202. In the case of a fluid hose connector 212, the associated bore forms a port for passage of pressurized fluid through the removable mounting plate 210. In the case of an electrical cable connector 214, the associated bore allows for passage therethrough of a body of the electrical cable connector 214 such that an opposite connecting end thereof can be exposed along a rear (vessel) side 210*b* of the removable mounting plate 210. Fluid hoses 128 and electrical cables 130 may be respectively connected to the fluid hose connectors 212 and the electrical cable connectors 214 to connect the removable mounting plate 210 to one or more pieces of coiled tubing equipment on the offshore platform 104.

While it is described above that the example of the quick-disconnect multi-coupler assembly 200 depicted in FIGS. 2-9 utilizes quick-disconnect connectors, it may be possible in other examples to instead utilize valves for fluid hose and electrical cable connection to the mounting plates 202, 210. However, valves are typically designed for internal use inside a hydraulic system and may have very tight tolerances between components and may require highly filtered fluids for reliable operation. Quick-disconnect connectors, on the other hand, are designed with the understanding that they will be exposed to air and contaminants. As a result, quick-disconnect connectors can remain reliable even if exposed to some degree of contaminants during the connection process.

A guiding mechanism may be provided to facilitate proper alignment of the fixed mounting plate 202 and the removable mounting plate 210 during a plate coupling operation. In this example, proper mounting plate alignment may be achieved through the use of guide pins 216 that extend from the fixed mounting plate 202 and are received in corresponding guide pin receiving holes 218 in the removable mounting plate 210 during coupling of the mounting plates 202, 210. In another example, a plurality of tabs or flat plates may extend from at least some of the peripheral edges of the fixed mounting plate 202 toward the removable mounting plate 210, thereby forming a cavity for receipt of the removable mounting plate 210 and alignment of the removable mounting plate 210 with the fixed mounting plate 202 during a mounting plate coupling operation. Other alignment mechanisms may be utilized in other examples.

A mounting plate coupling mechanism may be provided to force the mounting plates 202, 210 into secure coupling contact with each other. In this example, the mounting plate coupling mechanism is a cam mechanism 220. The cam mechanism may include a pair of rotating cam elements 222 that are attached to and rotate on the support framework 204 along opposite sides of the fixed mounting plate 202. Each rotating cam element 222 may include a cam slot 224. The cam slots 224 can be configured and positioned to receive cooperating cam pins 226 that are located on opposite sides of the removable mounting plate 210. The cam mechanism 220 may also include a handle 228 to facilitate manual operation of the cam mechanism 220 (i.e., rotation of the rotating cam element 222) during coupling of the mounting plates 202, 210. In operation of this example of the cam mechanism 220, a downward (relative to the quick-disconnect multi-coupler assembly orientation shown in FIGS. 2-9) rotation of the handle 228 from the disengaged position of FIGS. 2-5 to the engaged position of FIGS. 6-9 will cause the cam pins 226 on the removable mounting plate 210 to be drawn into the cam slots 224 in the rotating cam elements 222. Due to the curved shape of the cam slots 224, this will also cause the removable mounting plate 210 to be drawn against the fixed mounting plate 202 such that the mounting plates 202, 210 become tightly coupled as shown in FIGS. 6-9.

Other mounting plate coupling mechanisms may be employed in other examples. For example, a retractable element of a linear actuator, such as a piston rod of a hydraulic or pneumatic cylinder attached to the support framework 204 or to the fixed mounting plate 202, may be releasably coupled to the removable mounting plate 210, retracted to draw the removable mounting plate 210 into contact with the fixed mounting plate 202, and thereafter decoupled from the removable mounting plate 210. In some examples, the hydraulic or pneumatic cylinder may be a mounting plate decoupling cylinder (described in detail below), which may be provided with a piston rod having a free end of reduced diameter that can extend through an opening in the removable mounting plate 210 and be releasably coupled thereto (such as by a pin or another removable retainer).

When the mounting plates are coupled, the platform-side fluid hoses 128 and electrical cables 130 are coupled to corresponding vessel-side fluid hoses and electrical cables. Pressurized fluid or electrical energy may then be transferred from pressurized fluid and electrical energy sources on the floating support vessel through the fluid hoses and electrical cables coupled by the mounting plates 202, 210 and to the coiled tubing equipment on the offshore platform 104. Sealing elements such as O-rings may be installed around the pressurized fluid bores in the rear mating sides (faces) 202b, 210b of the mounting plates 202, 210 to promote a sealed fluid path through the mounting plates 202, 210.

The electrical cable connectors 208 in the fixed mounting plate 202 and the electrical cable connectors 214 in the removable mounting plate 210 may be cooperating halves of complete electrical cable connectors. For example, male electrical cable connector halves may be installed in the fixed mounting plate 202 and female electrical cable connector halves may be installed in the removable mounting plate 210, or vice versa. The first half of the complete electrical cable connector installed in the fixed mounting plate 202 can include a first end that is exposed along the front side 202a of the fixed mounting plate 202 for connection of an electrical cable leading to an electrical energy source on the floating support vessel 100, and a second end that is exposed by the corresponding bore along the rear side 202b of the fixed mounting plate 202 and is configured for electrical connection to a second half of the complete electrical cable connector. Similarly, the second half of the complete electrical cable connector installed in the removable mounting plate 210 can include a first end that is exposed along front side 210a of the removable mounting plate 210 for connection of an electrical cable leading to the offshore platform 104, and a second end that is exposed by the corresponding bore along the rear side 210b of the removable mounting plate 210 and is configured for electrical connection to the second end of the first half of the complete electrical cable connector located in the fixed mounting plate 202. In this manner, the electrical cable connector halves, and the electrical cables connected thereto, can be placed into conducting electrical communication upon coupling of the mounting plates 202, 210.

In the example of the quick-disconnect multi-coupler assembly 200 depicted in the drawing figures, the cam mechanism 220 does not include a mounting plate locking function. This allows mounting plate decoupling to be initiated from a remote location and for mounting plate decoupling to occur without the need to first rotate the cam mechanism 220 back to its disengaged position.

It is nonetheless desirable to releasably lock the removable mounting plate 210 to the fixed mounting plate 202 when the mounting plates are in a coupled arrangement. The quick-disconnect multi-coupler assembly 200 can thus include a plate locking mechanism for this purpose. The plate locking mechanism is preferably a mechanical plate locking mechanism to eliminate the need to rely on hydraulic pressure to maintain a coupled arrangement of the mounting plates 202, 210 during normal operation of the quick-disconnect multi-coupler assembly 200.

One example of a mechanical plate locking mechanism can include a pair of linear actuators, which in this example is a pair of hydraulic plate locking cylinders 230 that are mounted to the support framework 204 on the floating support vessel 100. It may be possible in other examples to instead utilize pneumatic cylinders or another type of linear actuator.

The plate locking cylinders 230 of the mechanical plate locking mechanism may be mounted to the support framework 204 so as to reside on opposite lateral sides of the fixed mounting plate 202 of the quick-disconnect multi-coupler assembly 200. Each plate locking cylinder 230 may be associated with a lock pin 232. For example, a lock pin 232 may be affixed to a free end of the piston rod 234 of each plate locking cylinder 230 or can otherwise be made to be movable with the piston rod 234 of each plate locking cylinder 230. In any case, the lock pins 232 are reciprocatable by the corresponding plate locking cylinders 230 between a locked and unlocked position relative to the mounting plates 202, 210. As depicted in FIGS. 2-5, when the mounting plates 202, 210 are uncoupled, the piston rods 234 of the plate locking cylinders 230 may be maintained in a retracted position to retain an unlocked position of the lock pins 232. As depicted in FIGS. 6-9, once the mounting plates 202, 210 are coupled, the piston rods 234 of the plate locking cylinders 230 may be extended to move the lock pins 232 into a locked position by which the mounting plates 202, 210 are releasably locked to each other. In another example, the pair of plate locking cylinders 230 and associated lock pins 232 may instead be a single plate locking cylinder 230 and associated lock pin 232 residing on only one side of the fixed mounting plate 202 of the quick-disconnect multi-coupler assembly 200.

Figure 5:
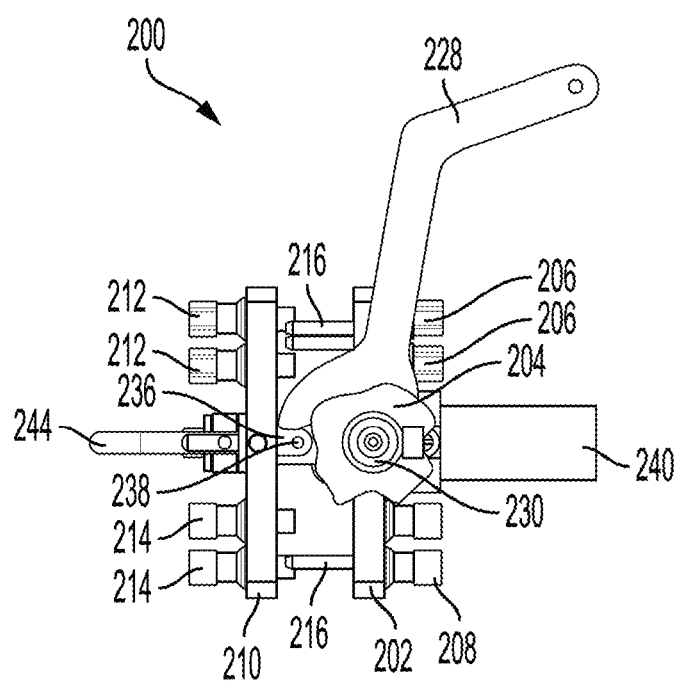
FIG. 5 is a side elevation view of the quick-disconnect multi-coupler assembly of FIG. 2.
Figure 6:
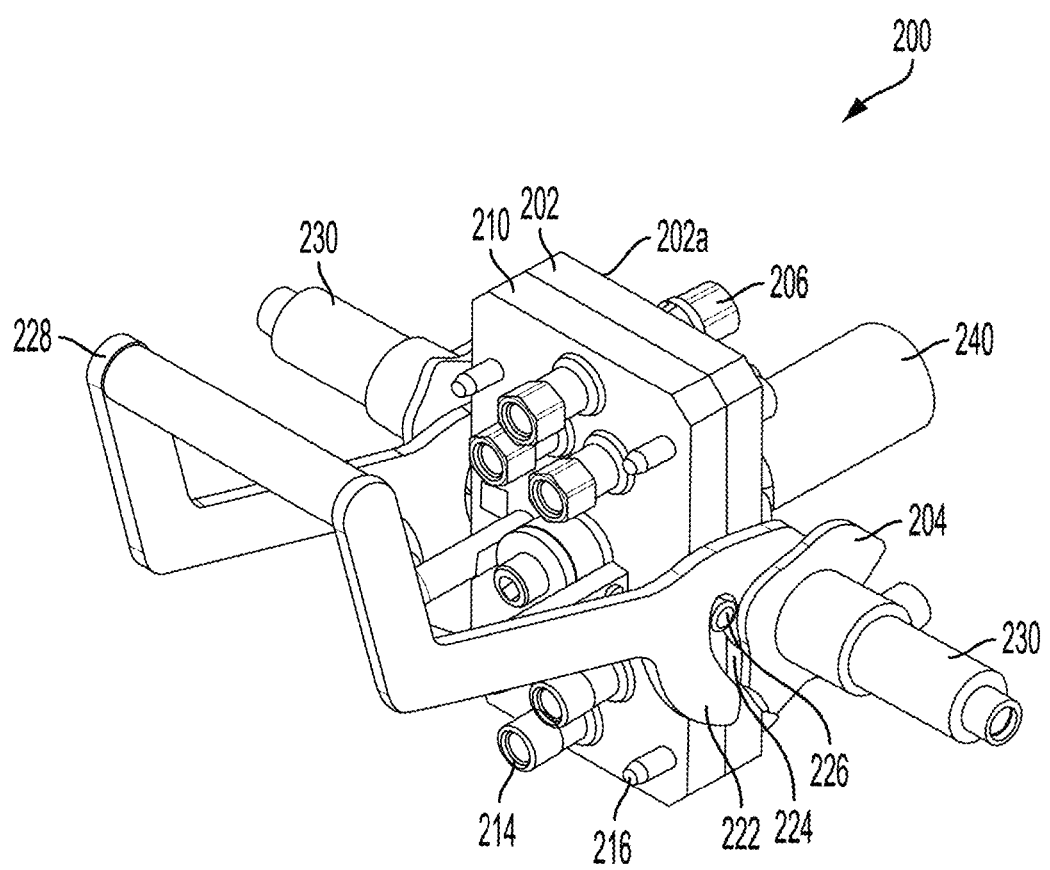
FIG. 6 is a perspective view of the quick-disconnect multi-coupler assembly of FIG. 2 in a connected position.
Figure 7:
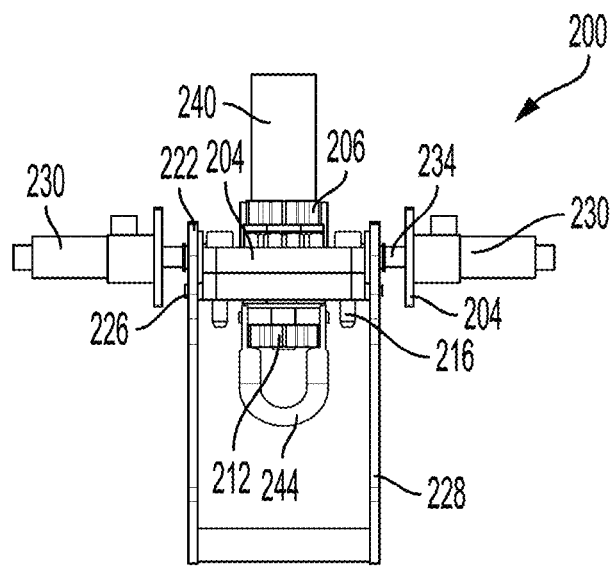
FIG. 7 is a top view of the quick-disconnect multi-coupler assembly of FIG. 6.
Figure 8:
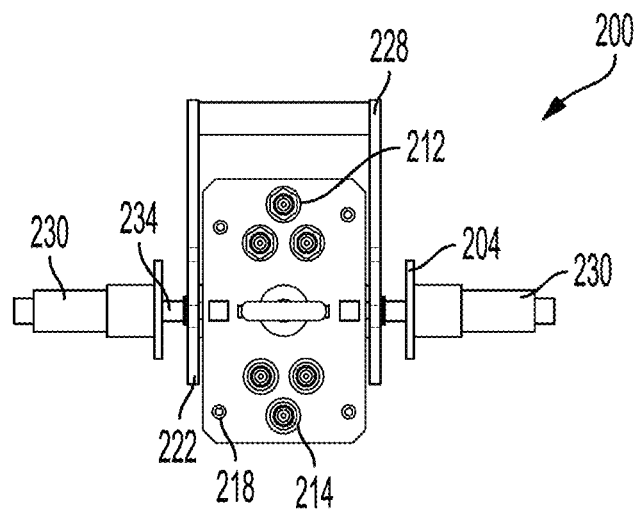
FIG. 8 is a front elevation view of the quick-disconnect multi-coupler assembly of FIG. 6.
Figure 9:
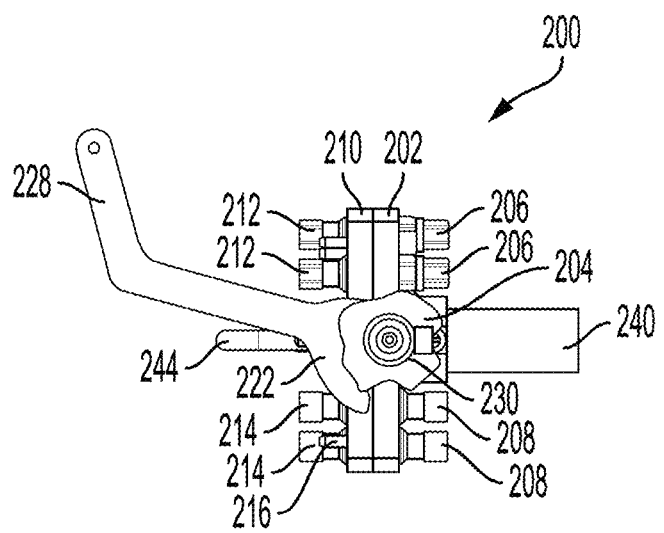
FIG. 9 is a side elevation view of the quick-disconnect multi-coupler assembly of FIG. 6.

As shown in FIG. 5, to facilitate a locking together of the coupled mounting plates 202, 210 by the lock pins 232, a pair of lock pin engagement elements 236 may extend rearward from the vessel side 210b of the removable mounting plate 210 toward the fixed mounting plate 202. The fixed mounting plate 202 may include a pair of corresponding lock pin engagement element receiving cavities (not visible) into or through which the lock pin engagement elements 236 may pass when the mounting plates 202, 210 are in a coupled arrangement. The sides of the fixed mounting plate 202 adjacent to the plate locking cylinders 230 may each include a cooperating lock pin receiving bore that extends into the lock pin engagement element receiving cavities. The lock pin receiving bores may be positioned and sized to allow passage of the lock pins 232 therethrough upon extension of the plate locking cylinder piston rods 234. The lock pin engagement elements 236 may also include lock pin receiving holes 238 that are aligned with the lock pin receiving bores in the fixed mounting plate 202 when the mounting plates 202, 210 are in a coupled arrangement. Displacement of the lock pins 232 through the lock pin receiving bores in the fixed mounting plate 202 and into the lock pin receiving holes 238 in the lock pin engagement elements 236 by the plate locking cylinders 230 can releasably lock the coupled mounting plates 202, 210 to each other. The locked mounting plates 202, 210 can be released by causing the plate locking cylinders 230 to retract the lock pins 232.

According to this example of the quick-disconnect multi-coupler assembly 200, it is not required to maintain piston rod-extending hydraulic pressure on the plate locking cylinders 230. Rather, once the lock pins 232 are engaged with the mounting plates 202, 210 and hydraulic pressure is applied to the fluid hoses 128 connected to the removable mounting plate 210, hydraulic pressure in the fluid hoses will produce a significant normal force on the lock pins 232. These normal forces will result in frictional forces on the lock pins 232 that can prevent any unintentional unlocking movement of the lock pins 232. In some examples, a pilot-operated (PO) check valve may also be placed in the hydraulic lines that supply pressurized hydraulic fluid to the piston (extend) side of the plate locking cylinders 230. The PO check valves can guard against unintended retraction of the lock pins 232 by ensuring that the plate locking cylinders 230 cannot be retracted until hydraulic fluid having a pressure greater than the rating of the PO check valve (e.g., 80 PSI) is applied to the rod (retract) side of the plate locking cylinders 230.

The quick-disconnect multi-coupler assembly 200 may further include a quick-disconnect mechanism for producing a quick disconnection of the coupled platform-side fluid hoses 128 and electrical cables 130 from the floating support vessel 100 via a forced and rapid decoupling of the mounting plates 202, 210. In the example depicted in FIGS. 2-9, the quick-disconnect mechanism includes a decoupling cylinder 240 for decoupling the coupled mounting plates 202, 210. In other examples, more than one decoupling cylinder 240 may be used to decouple the coupled mounting plates 202, 210. In some examples, the decoupling cylinder 240 may be a hydraulic cylinder. In other examples, it may be possible for the decoupling cylinder 240 to be a pneumatic cylinder. In either case, the decoupling cylinder 240 includes an extendable and retractable piston rod 242. The decoupling cylinder(s) 240 may be a double-acting cylinder or a single-acting cylinder with a spring return.

The decoupling cylinder 240 may be mounted to the vessel-side 202a of the fixed mounting plate 202 in some examples. In other examples, the decoupling cylinder 240 may be mounted to the support framework 204. In either case, the piston rod 242 of the decoupling cylinder 240 extends through an aperture in the fixed mounting plate 202 to make contact with the vessel-side 210b of the removable mounting plate 210. With the decoupling cylinder 240 securely affixed to the fixed mounting plate 202 or the support framework 204, extension of the decoupling cylinder piston rod 242 can impart a decoupling force against the vessel-side 210b of the removable mounting plate 210. The decoupling force exerted on the removable mounting plate 210 by the decoupling cylinder piston rod 242 may be an impact force or a non-impact (pressure) force. In either case, the decoupling force can cause a rapid decoupling of the coupled mounting plates 202, 210 by driving the removable mounting plate 210 away from the fixed mounting plate 202 and off of the guide pins 216.

The platform-side fluid hoses 128 and electrical cables 130 will remain connected to the removable mounting plate 210 subsequent to the forced decoupling operation. Therefore, the decoupling of the removable mounting plate 202 from the fixed mounting plate 202 also results in a corresponding rapid disconnection of the platform-side fluid hoses 128 and electrical cables 130 from the floating support vessel 100. The removable mounting plate 202 and the fluid hoses 128 and electrical cables 130 connected thereto may be easily recovered after a quick disconnection operation, as opposite ends of the fluid hoses 128 and electrical cables 130 remain coupled to equipment on the offshore platform 104. Once the condition(s) necessitating rapid decoupling of the mounting plates 202, 210 subsides, and after cleaning and inspection of the removable mounting plate 210, the removable mounting plate 210 and the fluid hoses 128 and electrical cables 130 connected thereto may be reconnected to the fixed mounting plate 202.

Activation of the quick-disconnect mechanism and forced decoupling of the mounting plates 202, 210 may be initiated remotely. For example, the decoupling cylinder 240, or a valve or other control element associated with the decoupling cylinder 240, may be communicatively coupled to a quick-disconnect controller in the control cabin 116 on the floating support vessel 100. The quick-disconnect controller may be an electronic controller that sends a signal to an electronic control valve, or the quick-disconnect controller may be a fluid control valve that directs pressurized hydraulic or pneumatic fluid to an extension side of the decoupling cylinder 240. In some examples, the fluid control valve may be located near the quick-disconnect multi-coupler assemblies 200, such as on the support frame 204. A fluid control valve(s) may be configured and placed in fluid communication with the quick-disconnect multi-coupler assemblies such that the fluid control valve can simultaneously release all the plate locking mechanisms or activate all the quick-disconnect mechanisms.

When necessary due to inclement weather, rough seas, loss of floating support vessel 100 position control, or otherwise, the quick-disconnect controller may be operated by personnel in the control cabin 116 to rapidly decouple the mounting plates 202, 210 and to correspondingly disconnect the platform-side fluid hoses 128 and electrical cables 130 from the floating support vessel 100. In some examples, operation of the quick-disconnect controller may first cause the plate locking cylinders 230 to retract the lock pins 232 before extending the piston rod 242 of the decoupling cylinder. For example, a sequencing manifold may be employed to appropriately direct pressurized fluid to the plate locking cylinders 230 and to the decoupling cylinder 240 in a proper order. In other examples, the plate locking cylinders 230 may be associated with a separate controller that is activated by personnel to retract the lock pins 232 before activating the quick-disconnect controller to activate the decoupling cylinder 240.

A decision to activate the decoupling cylinder 240 may be based on weather, sea, floating support vessel 100, or other conditions observed by personnel on the floating support vessel 100 or on the offshore platform 104. Alternatively, the quick-disconnect multi-coupler assembly 200 may be part of a system that includes or is in communication with at least one sensor that is configured to detect conditions dictating the need for quick disconnection of the platform-side fluid hoses 128 and electrical cables 130 from the floating support vessel 100. For example, the sensor may be a gyroscope or another type of motion detector that can detect excessive movement of the floating support vessel 100. The motion detector can resultantly produce a corresponding signal that is usable to generate an alert to personnel that activation of the decoupling cylinder 240 is recommended or required. In another example, a tension sensor that can detect excessive tension in the platform-side fluid hoses 128 or electrical cables 130, or in a wire, cable, rope, etc., connected between the offshore platform 104 and the fixed mounting plate 202 may be used for the same purpose. The use of other types of sensors may also be possible in other examples.

A quick-disconnect system incorporating the quick-disconnect multi-coupler assembly 200 may also include a backup decoupling mechanism for decoupling the mounting plates 202, 210 and correspondingly disconnecting the platform-side fluid hoses 128 and electrical cables 130 from the floating support vessel 100. The backup decoupling mechanism may be utilized, for example, in a case where a required remote activation of the quick-disconnect mechanism does not occur, or where the quick-disconnect mechanism fails to operate or does not operate properly. In one example of a backup decoupling mechanism, a coupling element 244 may be attached to the platform-side 210a of the removable mounting plate 210. A cable (e.g., wire rope) may be connected between the coupling element 244 and a point on the offshore platform 104. When tension in the cable caused by rough seas, improper position of the floating support vessel 100, or otherwise, becomes sufficient to overcome the weight of the removable mounting plate 210 and drag of the removable mounting plate 210 on the guide pins 216, the removable mounting plate 210 may be decoupled from the fixed mounting plate 202 by the tension force in the cable. The coupling element 244 may also be located near a center of the removable mounting plate 210 to reduce the drag of the removable mounting plate 210 on the guide pins 216 during decoupling of the removable mounting plate 210. The cable connected to the coupling element 244 may be shorter in length than the platform-side fluid hoses 128 or electrical cables 130 so that decoupling of the removable mounting plate 210 from the fixed mounting plate 202 will occur prior to the application of excessive tension on the fluid hoses 128 or the electrical cables 130.

In some examples, the backup decoupling mechanism may also operate even if the lock pins 232 of the mechanical plate locking mechanism have not been retracted. For example, the lock pins 232 may be designed to shear upon application of a shearing force of a predetermined magnitude. Consequently, when tension in the cable attached to the coupling element 244 becomes sufficient to apply a shearing force on the lock pins 232 that exceeds the predetermined shear force, the lock pins 232 maintaining the coupled arrangement of the mounting plates 202, 210 can shear and the mounting plates 202, 210 may be decoupled by the tension force in the cable.

In another example, where the coupling element 244 and associated cable are omitted, decoupling of the mounting plates 202, 210 may be caused by tension in the platform-side fluid hoses 128 and electrical cables 130 that are connected to the removable mounting plate 210. As with decoupling of the mounting plates 202, 210 due to tension in the cable attached to the decoupling element 244, decoupling of the mounting plates 202, 210 may occur when the lock pins 232 of the mechanical plate locking mechanism are retracted or by shearing the lock pins 232 in a case where the lock pins 232 are not retracted. In still another example, it is also possible to use a decoupling cylinder 240 that can exert sufficient force on the removable mounting plate 210 to shear the lock pins 232 in a case where the plate locking cylinders 230 fail to retract the lock pins 232 prior to activation of the decoupling cylinder 240.

Figure 10:
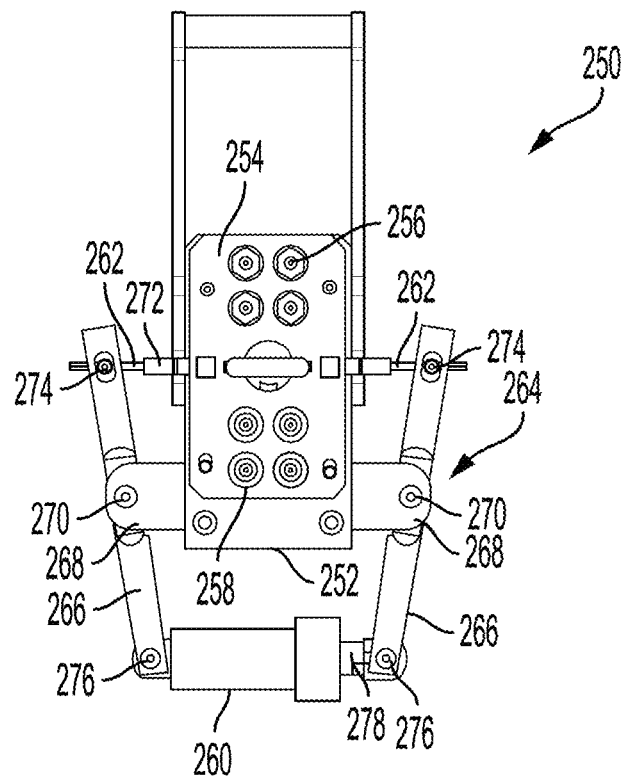
FIG. 10 is a front elevation view of another quick-disconnect multi-coupler assembly with mounting plates thereof in an unlocked condition according to an example of the present disclosure.
Figure 11:
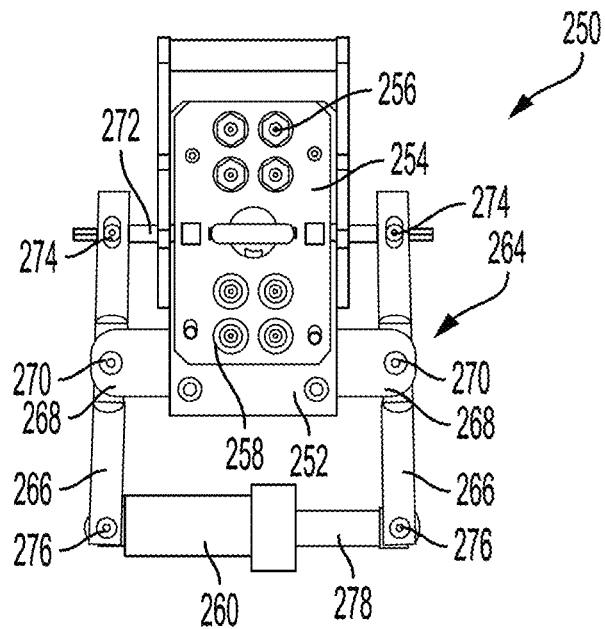
FIG. 11 is a front elevation view of the quick-disconnect multi-coupler assembly of FIG. 10 with the mounting plates thereof in a locked condition.
Figure 12:
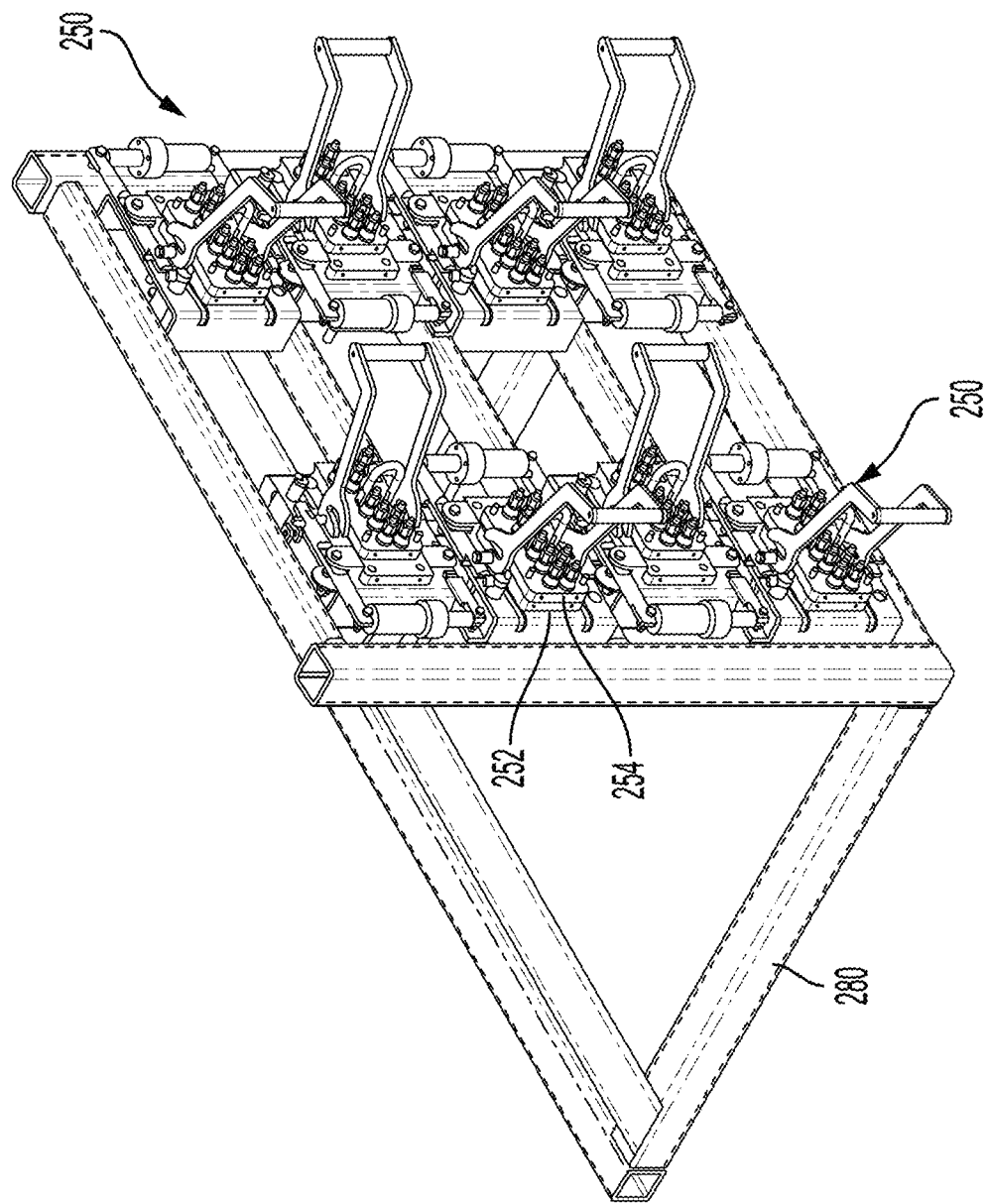
FIG. 12 is a perspective view depicting an array of the quick-disconnect multi-coupler assemblies of FIGS. 10-11 mounted to a support framework of a floating support vessel according to an example of the present disclosure.
Figure 13:
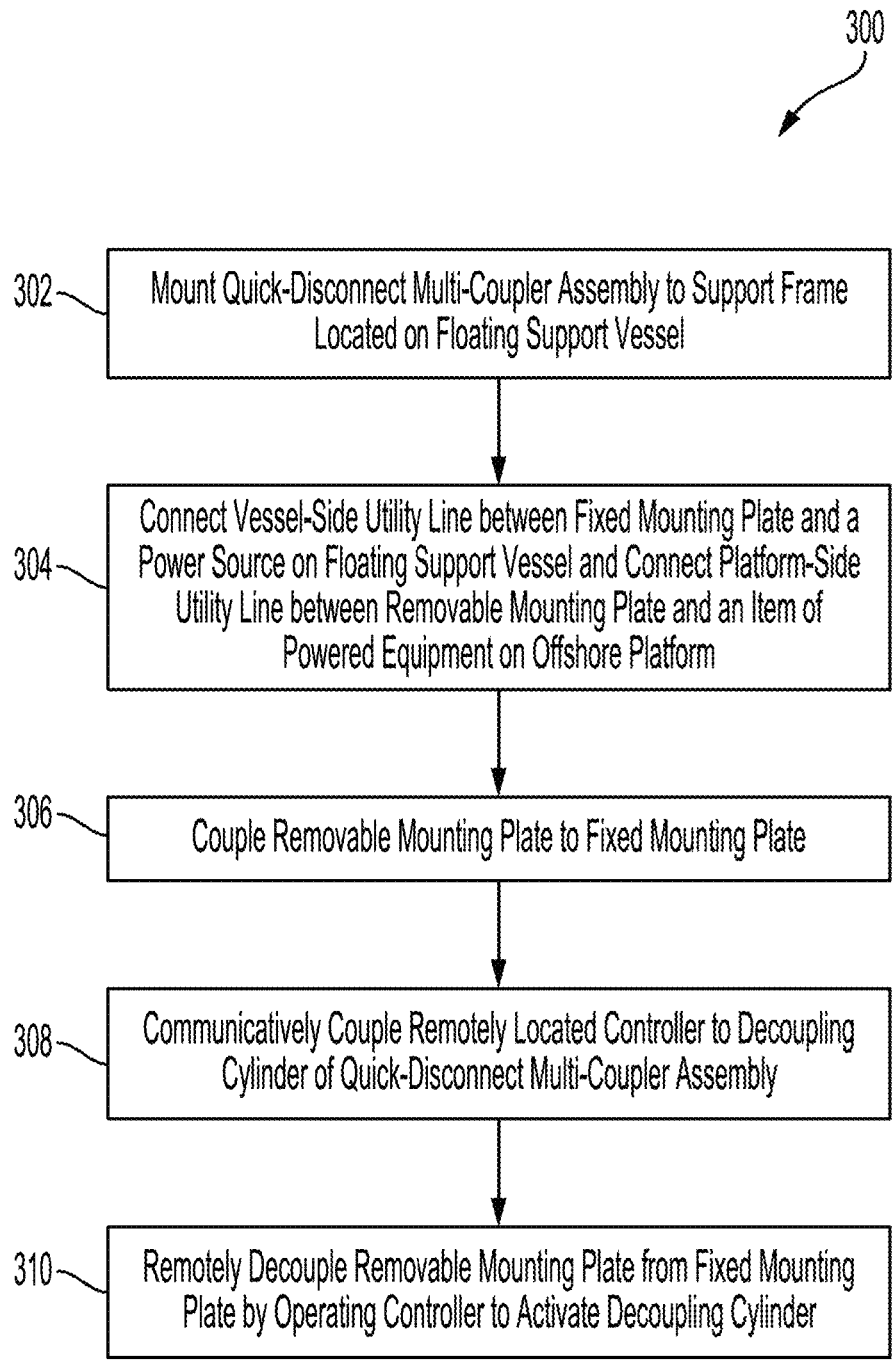
FIG. 13 is a flow chart representing one example of a method for quickly disconnecting utility lines connected between an offshore platform and a floating support vessel according to an example of the present disclosure.

FIGS. 10-11 illustrate another example of a quick-disconnect multi-coupler assembly 250 having a plate locking mechanism that utilizes only a single plate locking cylinder 264. The quick-disconnect multi-coupler assembly 250 may again include a vessel-side fixed mounting plate 252 and a platform-side removable mounting plate 254 that can be coupled to one another. Multiple utility line connectors such as fluid hose connectors and electrical cable connectors (not shown) may again be affixed to the fixed mounting plate 252, and multiple utility line connectors such as fluid hose connectors 256 and electrical cable connectors 258 are again affixed to the removable mounting plate 254. The utility line connectors may, but are not required to be, quick-disconnect connectors. Other than the two-cylinder plate locking mechanism, any other components or features associated with the previously described quick-disconnect multi-coupler assembly 200 or the mounting plates 202, 210 thereof can be applicable to the quick-disconnect multi-coupler assembly 250 and its associated fixed mounting plate 252 and removable mounting plate 254. For example, any example of a plate coupling mechanism or a quick disconnect mechanism described above relative to the quick-disconnect multi-coupler assembly 200 of FIG. 2-9 can also be applicable to the quick-disconnect multi-coupler assembly 250 of FIGS. 10-11. Likewise, as is shown in FIGS. 12-14, the quick-disconnect multi-coupler assembly 250 of FIGS. 10-11 can also be mounted to a supporting framework 280 in the same or a similar manner to the quick-disconnect multi-coupler assembly 200 of FIG. 2-9.

As shown in FIGS. 10-11, the quick-disconnect multi-coupler assembly 250 includes a plate locking mechanism having only a single plate locking cylinder 260 that operates a pair of opposed lock pins 262 using a pin locking linkage 264. The plate locking mechanism is depicted in an unlocked condition in FIG. 10 and in a locked condition in FIG. 11.

The plate locking linkage 264 may include a pair of linkage arms 266 that are disposed on opposite lateral sides of the fixed mounting plate 252. Linkage arm mounting elements 268 may extend from the opposite lateral sides of the fixed mounting plate 252 or may be a part of a support framework to which the quick-disconnect multi-coupler assembly 250 is mounted. The linkage arms 266 may be pivotably coupled to respective ones of the linkage arm mounting elements 268, such as by a first pinned connection 270. The lock pins 262 of this example of the plate locking mechanism may be affixed to the linkage arms 266 near a first end thereof and may extend through guides 272 on or associated with the fixed mounting plate 252 in some examples to facilitate proper linear movement of the lock pins 262. The lock pins 262 may be affixed to the linkage arms 266 in a manner that allows the linkage arms 266 to pivot relative to the lock pins 262, such as by a second pinned connection 274. The plate locking cylinder 260 may be mounted between and pivotably coupled to the linkage arms 266 near a second end thereof, such as by a third pinned connection 276.

When the piston rod 278 of the plate locking cylinder 260 is retracted, as shown in FIG. 10, the second ends of the linkage arms 266 are drawn inward toward the plate locking cylinder 260 and the first ends of the linkage arms 266 are driven outward away from the mounting plates 252, 254 due to rotation of the linkage arms 266 about the first pinned connection 270 on the linkage arm mounting elements 268. The lock pins 262 are retracted from the mounting plates 252, 254 when the linkage arms are in this position, and the mounting plates 252, 254 are in an unlocked state. When the piston rod 278 of the plate locking cylinder 260 is extended, as shown in FIG. 11, the second ends of the linkage arms 266 are driven outward away from the plate locking cylinder 260 and the first ends of the linkage arms 266 are drawn inward toward the mounting plates 252, 254 due to rotation of the linkage arms 266 about the first pinned connection 270 on the linkage arm mounting elements 268. The lock pins 262 are extended into the mounting plates 252, 254 when the linkage arms are in this position, and the mounting plates 252, 254 are in a locked state.

To facilitate releasable locking of the coupled mounting plates 252, 254, a pair of lock pin engagement elements (not visible in FIGS. 10-11) may again extend rearward from the vessel side of the removable mounting plate 254 toward the fixed mounting plate 252 in the same manner as described above relative to the quick-disconnect multi-coupler assembly 200 of FIGS. 2-9. Similarly, the fixed mounting plate 252 may again include a pair of corresponding lock pin engagement element receiving cavities into or through which the lock pin engagement elements may pass when the mounting plates 252, 254 are in a coupled arrangement, and the sides of the fixed mounting plate 252 adjacent to the lock pins 262 may each include a cooperating lock pin receiving bore that extends into the lock pin engagement element receiving cavities. The lock pin receiving bores may be positioned and sized to allow passage of the lock pins 262 therethrough upon extension of the plate locking cylinder piston rod 278 and operation of the pin locking linkage 264. The lock pin engagement elements may also again include lock pin receiving holes that are aligned with the lock pin receiving bores in the fixed mounting plate 252 when the mounting plates 252, 254 are in a coupled arrangement. Displacement of the lock pins 262 through the lock pin receiving bores in the fixed mounting plate 252 and into the lock pin receiving holes in the lock pin engagement elements by operation of the plate locking cylinder 260 in combination with the pin locking linkage 264 can releasably lock the coupled mounting plates 252, 254 to each other. The locked mounting plates 252, 254 can be released by causing the plate locking cylinder 260 to retract the lock pins 262 using the pin locking linkage 264

It is once again not required to maintain piston rod-extending hydraulic pressure on the plate locking cylinder 260. Rather, once the lock pins 262 are engaged with the mounting plates 252, 254 and hydraulic pressure is applied to the fluid hoses connected to the removable mounting plate 254, hydraulic pressure in the fluid hoses will produce a significant normal force on the lock pins 262. These normal forces will result in frictional forces on the lock pins 262 that can prevent any unintentional unlocking movement of the lock pins 262. In some examples, a pilot-operated (PO) check valve may also be placed in the hydraulic line that supplies pressurized hydraulic fluid to the piston (extend) side of the plate locking cylinder 260. The PO check valve can guard against unintended retraction of the lock pins 262 by ensuring that the plate locking cylinder 260 cannot be retracted until hydraulic fluid having a pressure greater than the rating of the PO check valve (e.g., 80 PSI) is applied to the rod (retract) side of the plate locking cylinder 260.

FIG. 12 depicts one example of an array of the quick-disconnect multi-coupler assemblies 250 of FIGS. 10-11 mounted to a support framework 280. As previously described with respect to the support framework 204, the support framework 280 may be installed to the floating support vessel 100. For example, the support framework 280 may be installed to a deck of the floating support vessel 100 and near an edge of the floating support vessel 100. Mounting the support framework 280 near an edge of the floating support vessel 100 can allow the removable mounting plates 252 of the quick-disconnect multi-coupler assemblies 250 and any fluid hoses and electrical cables connected thereto to more readily clear the floating support vessel 100 when the mounting plates 252, 254 are decoupled by operation of the quick-disconnect mechanism. Any number of quick-disconnect multi-coupler assemblies 250 may be affixed to the support framework 280, and the size and configuration of the support framework 280 can be adjusted to accommodate a different number or arrangement of quick-disconnect multi-coupler assemblies 250.

As may also be observed from a comparison of FIG. 12 with FIGS. 2-9, and FIGS. 10-11, the orientation of the quick-disconnect multi-coupler assemblies 250 may vary. For example, while the quick-disconnect multi-coupler assembly 200 of FIGS. 2-9 and the quick-disconnect multi-coupler assembly 250 of FIGS. 10-11 are shown in a substantially vertical orientation where the handle of the mounting plate coupling mechanism is movable in and up and down motion, each quick-disconnect multi-coupler assembly 250 of FIG. 12 is shown in a substantially horizontal orientation where the handle of the mounting plate coupling mechanism is movable in side-to-side motion. A combination of vertical, horizontal, or other quick-disconnect multi-coupler assembly orientations may be utilized in other examples.

FIG. 13 is a flow chart 300 representing one example of a method for rapidly disconnecting utility lines connected between an offshore platform and a floating support vessel. In one example, the utility line may carry pressurized fluid, electrical energy, or both, from the floating support vessel to the offshore platform to support a coiled tubing operation at the offshore platform. According to the method, at block 302, a quick-disconnect multi-coupler assembly is mounted to a support frame located on a floating support vessel. The quick-disconnect multi-coupler assembly may include a fixed mounting plate having at least one utility line connector that is located on a front side thereof and is associated with a corresponding bore through the fixed mounting plate, and a removable mounting plate having at least one utility line connector that is located on a front side thereof and is associated with a corresponding bore through the removable mounting plate. The quick-disconnect multi-coupler assembly may also include a decoupling cylinder located adjacent to the rear side of the fixed mounting plate and having a piston rod that is extendable through an aperture in the fixed mounting plate to impart a decoupling force against the rear side of the removable mounting plate when the removable mounting plate is coupled to the fixed mounting plate. In some examples, the quick-disconnect multi-coupler assembly may further include a mounting plate coupling mechanism that is operative to draw the removable mounting plate toward and against the fixed mounting plate, and a plate locking mechanism to releasably couple the removable mounting plate to the fixed mounting plate.

At block 304, a vessel-side utility line is connected between the at least one utility line connector on the fixed mounting plate of the quick-disconnect multi-coupler assembly and a power source on the floating support vessel, and a platform-side utility line is connected between the at least one utility line connector on the removable mounting plate of the quick-disconnect multi-coupler assembly and at least one item of coiled tubing equipment on an offshore platform located near the floating support vessel. The vessel-side utility line and the platform-side utility line can be a pressurized fluid hose or an electrical cable. The at least one item of coiled tubing equipment on the offshore platform may be, for example, a coiled tubing injector head.

At block 306, the removable mounting plate is coupled to the fixed mounting plate to provide a pressurized fluid or electrical energy pathway from the floating support vessel to the offshore platform.

At block 308, a remotely located controller is communicatively coupled to the decoupling cylinder of the quick-disconnect multi-coupler assembly, and at block 310 the removable mounting plate is remotely decoupled from the fixed mounting plate by operating the controller to activate the decoupling cylinder.

According to aspects of the present disclosure, a quick-disconnect multi-coupler assembly, a system, and a method, are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a quick-disconnect multi-coupler assembly for establishing a releasable utility connection between an offshore well platform and an off-platform power source, comprising: a fixed mounting plate having a front side and a rear side and at least one utility line connector located on the front side of the fixed mounting plate and associated with a corresponding bore through the fixed mounting plate; a removable mounting plate having a front side and a rear side and at least one utility line connector located on the front side of the removable mounting plate and associated with a corresponding bore through the removable mounting plate, the removable mounting plate being positionable for coupling to the fixed mounting plate such that the rear side of the removable mounting plate contacts the rear side of the fixed mounting plate with the bores in alignment; and a decoupling cylinder located adjacent to the rear side of the fixed mounting plate, the decoupling cylinder having a piston rod that is extendable through an aperture in the fixed mounting plate to impart a decoupling force against the rear side of the removable mounting plate when the removable mounting plate is coupled to the fixed mounting plate.

Example 2 is the quick-disconnect multi-coupler assembly of example 1, wherein a plurality of guide elements extend from one of the fixed mounting plate or the removable mounting plate, and are engageable with the other one of the fixed mounting plate or the removable mounting plate to cause an alignment of the fixed mounting plate and the removable mounting plate during coupling of the mounting plates.

Example 3 is the quick-disconnect multi-coupler assembly of example 1, further comprising a mounting plate coupling mechanism that is operative to draw the removable mounting plate toward and against the fixed mounting plate.

Example 4 is the quick-disconnect multi-coupler assembly of example 3, wherein the mounting plate coupling mechanism is selected from the group consisting of: a rotatable cam mechanism that is attached to the fixed mounting plate or to a support frame to which the fixed mounting plate is attached, and is configured and positioned to engage a cam pin located on the removable mounting plate; and a releasable coupling of the decoupling cylinder piston rod to the removable mounting plate.

Example 5 is the quick-disconnect multi-coupler assembly of example 1, further comprising a plate locking mechanism to releasably couple the removable mounting plate to the fixed mounting plate.

Example 6 is the quick-disconnect multi-coupler assembly of example 5, wherein the plate locking mechanism comprises: a pair of lock pins, one lock pin of the pair of lock pins disposed along opposite lateral sides of the fixed mounting plate; a pin locking linkage including a pair of linkage arms, one linkage arm of the pair of linkage arms pivotably mounted to or near each lateral side of the fixed mounting plate, and pivotably coupled at a first end thereof to one of the lock pins; an extendable plate locking cylinder connected between second ends of the linkage arms; a lock pin engagement element extending rearward from the rear side of the removable mounting plate and including a lock pin receiving hole; a receiving cavity located in the rear side of the fixed mounting plate, the receiving cavity positioned to receive the lock pin engagement element on the removable mounting plate upon coupling of the removable mounting plate to the fixed mounting plate; a cooperating lock pin receiving bore extending from the lateral side of the fixed mounting plate into the receiving cavity; and wherein the lock pin receiving hole in the lock pin engagement element is alignable with the lock pin receiving bore in the fixed mounting plate upon coupling of the removable mounting plate to the fixed mounting plate, and the lock pins are linearly displaceable by the plate locking cylinder through the lock pin receiving bore in the fixed mounting plate and into the lock pin receiving hole in the lock pin engagement element to releasably lock the removable mounting plate to the fixed mounting plate.

Example 7 is the quick-disconnect multi-coupler assembly of example 5, wherein the plate locking mechanism comprises: at least one plate locking cylinder disposed along a lateral side of the fixed mounting plate; a lock pin associated with the at least one plate locking cylinder and linearly displaceable by the at least one plate locking cylinder; a lock pin engagement element extending rearward from the rear side of the removable mounting plate and including a lock pin receiving hole; a receiving cavity located in the rear side of the fixed mounting plate, the receiving cavity positioned to receive the lock pin engagement element on the removable mounting plate upon coupling of the removable mounting plate to the fixed mounting plate; a cooperating lock pin receiving bore extending from the lateral side of the fixed mounting plate into the receiving cavity; and wherein the lock pin receiving hole in the lock pin engagement element is alignable with the lock pin receiving bore in the fixed mounting plate upon coupling of the removable mounting plate to the fixed mounting plate, and the lock pin is linearly displaceable by the at least one plate locking cylinder through the lock pin receiving bore in the fixed mounting plate and into the lock pin receiving hole in the lock pin engagement element to releasably lock the removable mounting plate to the fixed mounting plate.

Example 8 is a system for facilitating a releasable utility connection between an offshore well platform and an off-platform power source, comprising: a quick-disconnect multi-coupler assembly mounted to a support frame located on a floating support vessel, the quick-disconnect multi-coupler assembly comprising; a fixed mounting plate having a front side and a rear side and at least one utility line connector located on the front side of the fixed mounting plate and associated with a corresponding bore through the fixed mounting plate; a removable mounting plate having a front side and a rear side and at least one utility line connector located on the front side of the removable mounting plate and associated with a corresponding bore through the removable mounting plate, the removable mounting plate being positionable for coupling to the fixed mounting plate such that the rear side of the removable mounting plate contacts the rear side of the fixed mounting plate with the bores in alignment; and a decoupling cylinder located adjacent to the rear side of the fixed mounting plate, the decoupling cylinder having a piston rod that is extendable through an aperture in the fixed mounting plate to impart a decoupling force against the rear side of the removable mounting plate when the removable mounting plate is coupled to the fixed mounting plate; a vessel-side utility line connected between the at least one utility line connector on the fixed mounting plate of the quick-disconnect multi-coupler assembly and a power source on the floating support vessel; a platform-side utility line connected between the at least one utility line connector on the removable mounting plate of the quick-disconnect multi-coupler assembly and at least one item of powered equipment on the offshore well platform; and a controller located remotely from the quick-disconnect multi-coupler assembly and configured to activate the decoupling cylinder of the quick-disconnect multi-coupler assembly to disconnect the platform-side utility line from the floating support vessel by decoupling the removable mounting plate from a coupled arrangement with the fixed mounting plate.

Example 9 is the system of example 8, wherein: the utility line connected between the at least one utility line connector on the fixed mounting plate and the power source on the floating support vessel is a fluid hose or an electrical cable; and the power source on the floating support vessel is a pressurized fluid source or an electrical energy source.

Example 10 is the system of example 8, wherein the quick-disconnect multi-coupler assembly further comprises a plurality of guide elements extend from one of the fixed mounting plate or the removable mounting plate, and are engageable with the other one of the fixed mounting plate or the removable mounting plate to cause an alignment of the fixed mounting plate and the removable mounting plate during coupling of the mounting plates.

Example 11 is the system of example 8, wherein the quick-disconnect multi-coupler assembly further includes a mounting plate coupling mechanism that is operative to draw the removable mounting plate toward and against the fixed mounting plate.

Example 12 is the system of example 8, wherein the quick-disconnect multi-coupler assembly further includes a plate locking mechanism to releasably couple the removable mounting plate to the fixed mounting plate, the plate locking mechanism comprising: a pair of lock pins, one lock pin of the pair of lock pins disposed along opposite lateral sides of the fixed mounting plate; a pin locking linkage including a pair of linkage arms, one linkage arm of the pair of linkage arms pivotably mounted to or near each lateral side of the fixed mounting plate, and pivotably coupled at a first end thereof to one of the lock pins; an extendable plate locking cylinder connected between second ends of the linkage arms; a lock pin engagement element extending rearward from the rear side of the removable mounting plate and including a lock pin receiving hole; a receiving cavity located in the rear side of the fixed mounting plate, the receiving cavity positioned to receive the lock pin engagement element on the removable mounting plate upon coupling of the removable mounting plate to the fixed mounting plate; a cooperating lock pin receiving bore extending from the lateral side of the fixed mounting plate into the receiving cavity; and wherein the lock pin receiving hole in the lock pin engagement element is alignable with the lock pin receiving bore in the fixed mounting plate upon coupling of the removable mounting plate to the fixed mounting plate, and the lock pins are linearly displaceable by the plate locking cylinder through the lock pin receiving bore in the fixed mounting plate and into the lock pin receiving hole in the lock pin engagement element to releasably lock the removable mounting plate to the fixed mounting plate.

Example 13 is the system of example 12, wherein the controller is configured, upon operation thereof, to cause the plate locking cylinder of the plate locking mechanism to retract the lock pins, and to subsequently activate the decoupling cylinder.

Example 14 is the system of example 12, further comprising a backup decoupling mechanism including: a coupling element affixed to the front side of the removable mounting plate; a cable connected between the coupling element and the offshore well platform; and wherein the removable mounting plate is decoupleable from the fixed mounting plate by a tension force in the cable.

Example 15 is the system of example 14, wherein the lock pins of the plate locking mechanism are configured to shear upon the tension force in the cable reaching a predetermined magnitude.

Example 16 is a method, comprising: mounting a quick-disconnect multi-coupler assembly to a support frame located on an offshore well platform floating support vessel, the quick-disconnect multi-coupler assembly comprising; a fixed mounting plate having a front side and a rear side and at least one utility line connector located on the front side of the fixed mounting plate and associated with a corresponding bore through the fixed mounting plate; a removable mounting plate having a front side and a rear side and at least one utility line connector located on the front side of the removable mounting plate and associated with a corresponding bore through the removable mounting plate, the removable mounting plate being positionable for coupling to the fixed mounting plate such that the rear side of the removable mounting plate contacts the rear side of the fixed mounting plate with the bores in alignment; and a decoupling cylinder located adjacent to the rear side of the fixed mounting plate, the decoupling cylinder having a piston rod that is extendable through an aperture in the fixed mounting plate to impart a decoupling force against the rear side of the removable mounting plate when the removable mounting plate is coupled to the fixed mounting plate; connecting a vessel-side utility line between the at least one utility line connector on the fixed mounting plate of the quick-disconnect multi-coupler assembly and a power source on the floating support vessel; connecting a platform-side utility line between the at least one utility line connector on the removable mounting plate of the quick-disconnect multi-coupler assembly and at least one item of powered equipment on the offshore well platform; coupling the removable mounting plate to the fixed mounting plate to provide a pressurized fluid or electrical energy pathway from the floating support vessel to the powered equipment on the offshore well platform; communicatively coupling a remotely located controller to the decoupling cylinder of the quick-disconnect multi-coupler assembly; and remotely decoupling the removable mounting plate from the fixed mounting plate by operating the controller to activate the decoupling cylinder.

Example 17 is the method of example 16, wherein: the utility line connected between the at least one utility line connector on the fixed mounting plate and the power source on the floating support vessel is a fluid hose or an electrical cable; and the power source on the floating support vessel is a pressurized fluid source or an electrical energy source.

Example 18 is the method of example 16, wherein the quick-disconnect multi-coupler assembly further includes a plate locking mechanism to releasably couple the removable mounting plate to the fixed mounting plate, the plate locking mechanism comprising: a pair of lock pins, one lock pin of the pair of lock pins disposed along opposite lateral sides of the fixed mounting plate; a pin locking linkage including a pair of linkage arms, one linkage arm of the pair of linkage arms pivotably mounted to or near each lateral side of the fixed mounting plate, and pivotably coupled at a first end thereof to one of the lock pins; an extendable plate locking cylinder connected between second ends of the linkage arms; a lock pin engagement element extending rearward from the rear side of the removable mounting plate and including a lock pin receiving hole; a receiving cavity located in the rear side of the fixed mounting plate, the receiving cavity positioned to receive the lock pin engagement element on the removable mounting plate upon coupling of the removable mounting plate to the fixed mounting plate; a cooperating lock pin receiving bore extending from the lateral side of the fixed mounting plate into the receiving cavity; and wherein the lock pin receiving hole in the lock pin engagement element is alignable with the lock pin receiving bore in the fixed mounting plate upon coupling of the removable mounting plate to the fixed mounting plate, and the lock pins are linearly displaceable by the plate locking cylinder through the lock pin receiving bore in the fixed mounting plate and into the lock pin receiving hole in the lock pin engagement element to releasably lock the removable mounting plate to the fixed mounting plate.

Example 19 is the method of example 18, wherein operating the controller causes the plate locking cylinder of the plate locking mechanism to retract the lock pins, and subsequently activates the decoupling cylinder.

Example 20 is the method of example 16, further comprising: providing a backup decoupling mechanism including a coupling element affixed to the front side of the removable mounting plate and a cable connected between the coupling element and the offshore well platform; and causing, upon a failure of the decoupling cylinder to decouple the removable mounting plate from the fixed mounting plate, the removable mounting plate to be decoupled from the removable mounting plate by a tension force generated in the cable.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A quick-disconnect multi-coupler assembly for establishing a releasable utility connection between an offshore well platform and an off-platform power source, comprising:
   a fixed mounting plate having a front side and a rear side and at least one utility line connector located on the front side of the fixed mounting plate and associated with a corresponding bore through the fixed mounting plate;
   a removable mounting plate having a front side and a rear side and at least one utility line connector located on the front side of the removable mounting plate and associated with a corresponding bore through the removable mounting plate, the removable mounting plate being positionable for coupling to the fixed mounting plate such that the rear side of the removable mounting plate contacts the rear side of the fixed mounting plate with the bores in alignment; and
   a decoupling cylinder located adjacent to the rear side of the fixed mounting plate, the decoupling cylinder having a piston rod that is extendable through an aperture in the fixed mounting plate to impart a decoupling force against the rear side of the removable mounting plate when the removable mounting plate is coupled to the fixed mounting plate.

2. The quick-disconnect multi-coupler assembly of claim 1, wherein a plurality of guide elements extend from one of the fixed mounting plate or the removable mounting plate, and are engageable with the other one of the fixed mounting plate or the removable mounting plate to cause an alignment of the fixed mounting plate and the removable mounting plate during coupling of the mounting plates.

3. The quick-disconnect multi-coupler assembly of claim 1, further comprising a mounting plate coupling mechanism that is operative to draw the removable mounting plate toward and against the fixed mounting plate.

4. The quick-disconnect multi-coupler assembly of claim 3, wherein the mounting plate coupling mechanism is selected from the group consisting of:
   a rotatable cam mechanism that is attached to the fixed mounting plate or to a support frame to which the fixed mounting plate is attached, and is configured and positioned to engage a cam pin located on the removable mounting plate; and
   a releasable coupling of the decoupling cylinder piston rod to the removable mounting plate.

5. The quick-disconnect multi-coupler assembly of claim 1, further comprising a plate locking mechanism to releasably couple the removable mounting plate to the fixed mounting plate.

6. The quick-disconnect multi-coupler assembly of claim 5, wherein the plate locking mechanism comprises:

a pair of lock pins, one lock pin of the pair of lock pins disposed along opposite lateral sides of the fixed mounting plate;

a pin locking linkage including a pair of linkage arms, one linkage arm of the pair of linkage arms pivotably mounted to or near each lateral side of the fixed mounting plate, and pivotably coupled at a first end thereof to one of the lock pins;

an extendable plate locking cylinder connected between second ends of the linkage arms;

a lock pin engagement element extending rearward from the rear side of the removable mounting plate and including a lock pin receiving hole;

a receiving cavity located in the rear side of the fixed mounting plate, the receiving cavity positioned to receive the lock pin engagement element on the removable mounting plate upon coupling of the removable mounting plate to the fixed mounting plate;

a cooperating lock pin receiving bore extending from the lateral side of the fixed mounting plate into the receiving cavity; and wherein the lock pin receiving hole in the lock pin engagement element is alignable with the lock pin receiving bore in the fixed mounting plate upon coupling of the removable mounting plate to the fixed mounting plate, and the lock pins are linearly displaceable by the plate locking cylinder through the lock pin receiving bore in the fixed mounting plate and into the lock pin receiving hole in the lock pin engagement element to releasably lock the removable mounting plate to the fixed mounting plate.

7. The quick-disconnect multi-coupler assembly of claim 5, wherein the plate locking mechanism comprises:

at least one plate locking cylinder disposed along a lateral side of the fixed mounting plate;

a lock pin associated with the at least one plate locking cylinder and linearly displaceable by the at least one plate locking cylinder;

a lock pin engagement element extending rearward from the rear side of the removable mounting plate and including a lock pin receiving hole;

a receiving cavity located in the rear side of the fixed mounting plate, the receiving cavity positioned to receive the lock pin engagement element on the removable mounting plate upon coupling of the removable mounting plate to the fixed mounting plate;

a cooperating lock pin receiving bore extending from the lateral side of the fixed mounting plate into the receiving cavity; and wherein the lock pin receiving hole in the lock pin engagement element is alignable with the lock pin receiving bore in the fixed mounting plate upon coupling of the removable mounting plate to the fixed mounting plate, and the lock pin is linearly displaceable by the at least one plate locking cylinder through the lock pin receiving bore in the fixed mounting plate and into the lock pin receiving hole in the lock pin engagement element to releasably lock the removable mounting plate to the fixed mounting plate.

8. A system for facilitating a releasable utility connection between an offshore well platform and an off-platform power source, comprising:

a quick-disconnect multi-coupler assembly mounted to a support frame located on a floating support vessel, the quick-disconnect multi-coupler assembly comprising;

a fixed mounting plate having a front side and a rear side and at least one utility line connector located on the front side of the fixed mounting plate and associated with a corresponding bore through the fixed mounting plate;

a removable mounting plate having a front side and a rear side and at least one utility line connector located on the front side of the removable mounting plate and associated with a corresponding bore through the removable mounting plate, the removable mounting plate being positionable for coupling to the fixed mounting plate such that the rear side of the removable mounting plate contacts the rear side of the fixed mounting plate with the bores in alignment; and a decoupling cylinder located adjacent to the rear side of the fixed mounting plate, the decoupling cylinder having a piston rod that is extendable through an aperture in the fixed mounting plate to impart a decoupling force against the rear side of the removable mounting plate when the removable mounting plate is coupled to the fixed mounting plate;

a vessel-side utility line connected between the at least one utility line connector on the fixed mounting plate of the quick-disconnect multi-coupler assembly and a power source on the floating support vessel;

a platform-side utility line connected between the at least one utility line connector on the removable mounting plate of the quick-disconnect multi-coupler assembly and at least one item of powered equipment on the offshore well platform; and a controller located remotely from the quick-disconnect multi-coupler assembly and configured to activate the decoupling cylinder of the quick-disconnect multi-coupler assembly to disconnect the platform-side utility line from the floating support vessel by decoupling the removable mounting plate from a coupled arrangement with the fixed mounting plate.

9. The system of claim 8, wherein:

the utility line connected between the at least one utility line connector on the fixed mounting plate and the power source on the floating support vessel is a fluid hose or an electrical cable; and the power source on the floating support vessel is a pressurized fluid source or an electrical energy source.

10. The system of claim 8, wherein the quick-disconnect multi-coupler assembly further comprises a plurality of guide elements extend from one of the fixed mounting plate or the removable mounting plate, and are engageable with the other one of the fixed mounting plate or the removable mounting plate to cause an alignment of the fixed mounting plate and the removable mounting plate during coupling of the mounting plates.

11. The system of claim 8, wherein the quick-disconnect multi-coupler assembly further includes a mounting plate coupling mechanism that is operative to draw the removable mounting plate toward and against the fixed mounting plate.

12. The system of claim 8, wherein the quick-disconnect multi-coupler assembly further includes a plate locking mechanism to releasably couple the removable mounting plate to the fixed mounting plate, the plate locking mechanism comprising:

a pair of lock pins, one lock pin of the pair of lock pins disposed along opposite lateral sides of the fixed mounting plate;

a pin locking linkage including a pair of linkage arms, one linkage arm of the pair of linkage arms pivotably mounted to or near each lateral side of the fixed mounting plate, and pivotably coupled at a first end thereof to one of the lock pins;
an extendable plate locking cylinder connected between second ends of the linkage arms;
a lock pin engagement element extending rearward from the rear side of the removable mounting plate and including a lock pin receiving hole;
a receiving cavity located in the rear side of the fixed mounting plate, the receiving cavity positioned to receive the lock pin engagement element on the removable mounting plate upon coupling of the removable mounting plate to the fixed mounting plate;
a cooperating lock pin receiving bore extending from the lateral side of the fixed mounting plate into the receiving cavity; and
wherein the lock pin receiving hole in the lock pin engagement element is alignable with the lock pin receiving bore in the fixed mounting plate upon coupling of the removable mounting plate to the fixed mounting plate, and the lock pins are linearly displaceable by the plate locking cylinder through the lock pin receiving bore in the fixed mounting plate and into the lock pin receiving hole in the lock pin engagement element to releasably lock the removable mounting plate to the fixed mounting plate.

13. The system of claim 12, wherein the controller is configured, upon operation thereof, to cause the plate locking cylinder of the plate locking mechanism to retract the lock pins, and to subsequently activate the decoupling cylinder.

14. The system of claim 12, further comprising a backup decoupling mechanism including:
a coupling element affixed to the front side of the removable mounting plate;
a cable connected between the coupling element and the offshore well platform; and
wherein the removable mounting plate is decoupleable from the fixed mounting plate by a tension force in the cable.

15. The system of claim 14, wherein the lock pins of the plate locking mechanism are configured to shear upon the tension force in the cable reaching a predetermined magnitude.

16. A method, comprising:
mounting a quick-disconnect multi-coupler assembly to a support frame located on an offshore well platform floating support vessel, the quick-disconnect multi-coupler assembly comprising;
a fixed mounting plate having a front side and a rear side and at least one utility line connector located on the front side of the fixed mounting plate and associated with a corresponding bore through the fixed mounting plate;
a removable mounting plate having a front side and a rear side and at least one utility line connector located on the front side of the removable mounting plate and associated with a corresponding bore through the removable mounting plate, the removable mounting plate being positionable for coupling to the fixed mounting plate such that the rear side of the removable mounting plate contacts the rear side of the fixed mounting plate with the bores in alignment; and
a decoupling cylinder located adjacent to the rear side of the fixed mounting plate, the decoupling cylinder having a piston rod that is extendable through an aperture in the fixed mounting plate to impart a decoupling force against the rear side of the removable mounting plate when the removable mounting plate is coupled to the fixed mounting plate;
connecting a vessel-side utility line between the at least one utility line connector on the fixed mounting plate of the quick-disconnect multi-coupler assembly and a power source on the floating support vessel;
connecting a platform-side utility line between the at least one utility line connector on the removable mounting plate of the quick-disconnect multi-coupler assembly and at least one item of powered equipment on the offshore well platform;
coupling the removable mounting plate to the fixed mounting plate to provide a pressurized fluid or electrical energy pathway from the floating support vessel to the powered equipment on the offshore well platform;
communicatively coupling a remotely located controller to the decoupling cylinder of the quick-disconnect multi-coupler assembly; and
remotely decoupling the removable mounting plate from the fixed mounting plate by operating the controller to activate the decoupling cylinder.

17. The method of claim 16, wherein:
the utility line connected between the at least one utility line connector on the fixed mounting plate and the power source on the floating support vessel is a fluid hose or an electrical cable; and
the power source on the floating support vessel is a pressurized fluid source or an electrical energy source.

18. The method of claim 16, wherein the quick-disconnect multi-coupler assembly further includes a plate locking mechanism to releasably couple the removable mounting plate to the fixed mounting plate, the plate locking mechanism comprising:
a pair of lock pins, one lock pin of the pair of lock pins disposed along opposite lateral sides of the fixed mounting plate;
a pin locking linkage including a pair of linkage arms, one linkage arm of the pair of linkage arms pivotably mounted to or near each lateral side of the fixed mounting plate, and pivotably coupled at a first end thereof to one of the lock pins;
an extendable plate locking cylinder connected between second ends of the linkage arms;
a lock pin engagement element extending rearward from the rear side of the removable mounting plate and including a lock pin receiving hole;
a receiving cavity located in the rear side of the fixed mounting plate, the receiving cavity positioned to receive the lock pin engagement element on the removable mounting plate upon coupling of the removable mounting plate to the fixed mounting plate;
a cooperating lock pin receiving bore extending from the lateral side of the fixed mounting plate into the receiving cavity; and
wherein the lock pin receiving hole in the lock pin engagement element is alignable with the lock pin receiving bore in the fixed mounting plate upon coupling of the removable mounting plate to the fixed mounting plate, and the lock pins are linearly displaceable by the plate locking cylinder through the lock pin receiving bore in the fixed mounting plate and into the lock pin receiving hole in the lock pin engagement element to releasably lock the removable mounting plate to the fixed mounting plate.

19. The method of claim 18, wherein operating the controller causes the plate locking cylinder of the plate locking mechanism to retract the lock pins, and subsequently activates the decoupling cylinder.

20. The method of claim 16, further comprising:
- providing a backup decoupling mechanism including a coupling element affixed to the front side of the removable mounting plate and a cable connected between the coupling element and the offshore well platform; and
- causing, upon a failure of the decoupling cylinder to decouple the removable mounting plate from the fixed mounting plate, the removable mounting plate to be decoupled from the removable mounting plate by a tension force generated in the cable.

* * * * *